Feb. 9, 1960

E. H. ANDERSON 2,924,389

AUTOMOBILE GUIDING DEVICE

Filed April 28, 1958

INVENTOR.
ELDON H. ANDERSON

BY
Reynolds, Beach & Christensen

ATTORNEYS

Feb. 9, 1960

E. H. ANDERSON 2,924,389

AUTOMOBILE GUIDING DEVICE

Filed April 28, 1958

INVENTOR.
ELDON H. ANDERSON

BY
Reynolds, Broch & Christensen

ATTORNEYS

United States Patent Office 2,924,389
Patented Feb. 9, 1960

2,924,389

AUTOMOBILE GUIDING DEVICE

Eldon H. Anderson, Seattle, Wash.

Application April 28, 1958, Serial No. 731,458

4 Claims. (Cl. 238—4)

This invention relates to apparatus for guiding vehicles, particularly automobiles, around a turn and into alignment with a predetermined new path of travel. A broad object hereof is to enable automobiles to execute a sharp turn and to be straightened in alignment with the new path of travel in a relatively short distance, regardless of variations in width or length of automobiles using the apparatus and regardless of moderate or normal variations in the path of approach to the guiding apparatus. The invention is herein illustratively described by reference to the presently preferred forms thereof intended for use in automatic washing establishments for automobiles; however, it would be recognized that the invention has other applications as well and that certain modifications and changes therein with respect to details may be made without departing from the essential features involved.

Car washing establishments of the automatic or production line type use a conveyor by which the cars are moved in succession at a controlled rate and at proper spacing through a series of stations at which the different washing operations are performed, some by machine and some usually by hand. Because of wide variations in the width, length, and undercarriage construction of cars, it becomes important to provide conveyor apparatus of a versatile type and also of importance to guide the different cars consistently into proper pick-up position and alignment with relation to the conveyor apparatus so they register properly with the washing machinery while being advanced by the conveyor.

The problem of present concern, and which is experienced in most establishments of this type, is that of guiding each car into proper pick-up position and alignment relative to the conveyor apparatus in a very short turning distance. It is rare that suitable sites are available on which to build these establishments which are long enough or so arranged in relation to streets and alleys to permit automobiles to approach the conveyor apparatus for an appreciable distance in a straight line. Usually the more attractive sites are in heavily populated areas wherein land is very expensive and the lots are small and situated so that automobiles are required to enter and leave by the same street or by streets which are set at right angles. The conveyor apparatus and associated washing machinery are arranged in a relatively long straight path which occupies most of the length of the usual lot and requires that the automobiles make the approach to the entrance end of the conveyor apparatus in a sharp U-turn or right-angle turn. If the automobile is permitted to complete its turn in the normal manner, it will require approximately two or more lengths of the automobile traveling in the new direction before the rear wheels have fallen into correct alignment with the front wheels. Room is not available to permit this and it is necessary that the rear wheels be brought into alignment with the front wheels immediately upon entering the conveyor apparatus so that the full usable length of the lot may be employed in the washing processes.

The present invention successfully solves this problem, and in particular provides an efficient and reliable apparatus for guiding the turning cars consistently into accurate positional relationship to a reference line or guide in the conveyor apparatus.

Another object is to provide guiding apparatus which will not interfere with low-placed parts of the understructures of cars and will accept cars of varying widths and lengths and of varying tire sizes.

Another object is the provision of such guiding apparatus which is relatively inexpensive and furthermore which is substantially fool-proof so that the ability of the driver plays relatively small part in the success of the guiding operation.

In the preferred form of the invention, a car turning through the approach to the conveyor apparatus crosses a traversing plate movable transversely to the line of the conveyor. The front wheels are steered by the driver into the new path of travel with one front wheel indexed to a longitudinal guide rail extending lengthwise of the conveyor apparatus. As the rear wheels roll onto the traversing plate one such rear wheel strikes a first inclined deflector rail and thereby causes the rear wheels of the car to be slued sidewise on the movable traversing plate toward alignment with the front wheels. Final alignment is achieved by further sluing movement of the rear of the car as a rear wheel strikes a second deflector rail. Preferably the latter deflector rail is relatively short and, with the longitudinal guide rail, is situated on the side of the final path of travel which represents the outside of the turn executed by the automobile in making the approach, whereas the first-mentioned deflector rail is situated on the opposite side, so as to be initially engageable by the rear wheel which is on the inside of the turn. Such initial engagement swings the car far enough toward the outside of the turn to permit the opposite rear wheel to be engaged by the second deflector rail. The latter may thereby be made relatively short so that it does not interfere with the approaching cars. The disclosure also includes a modification wherein both deflector rails cooperate with the same rear wheel.

These and other features, objects and advantages of the invention will become more fully evident from the following description thereof by reference to the accompanying drawings.

Figure 1:
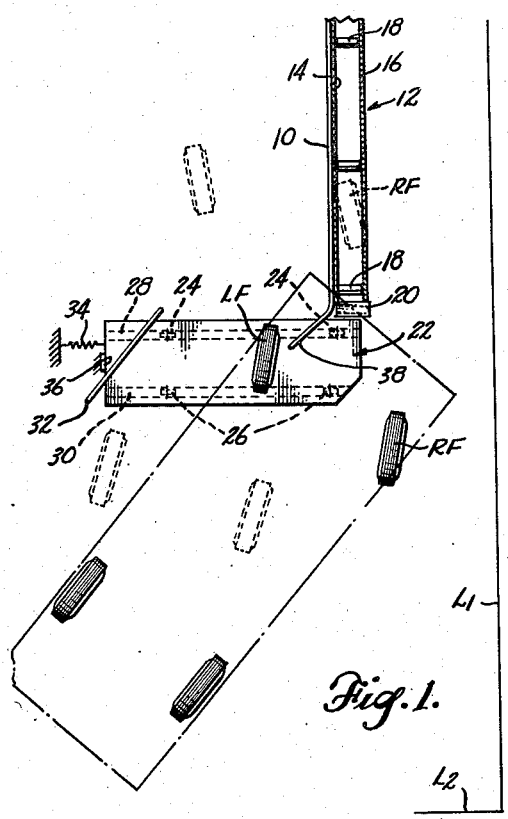
Figure 1 is a simplified plan view of a preferred form of the guiding apparatus according to this invention, the view illustrating an automobile of average size making a typical approach to the conveyor apparatus.
Figure 2:
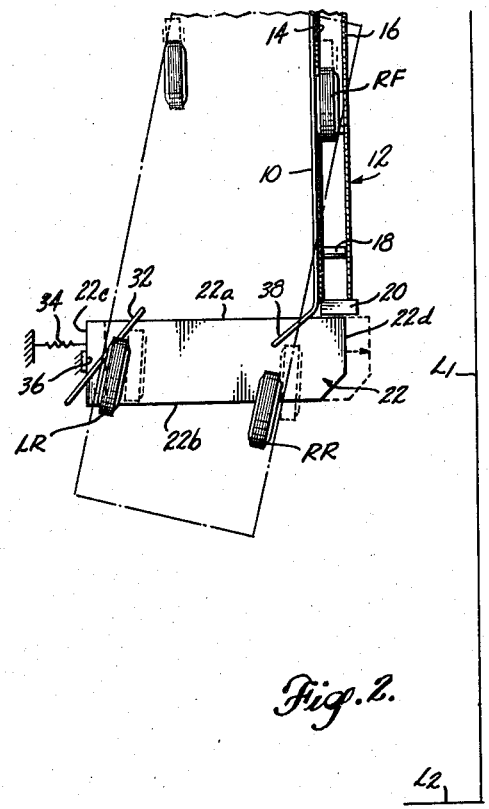
Figure 2 is a similar view showing the automobile in such position that the guiding apparatus is initiating the sluing of the rear of the automobile toward alignment with the conveyor means.

Referring to Figures 1 to 4, inclusive, a longitudinal guide rail 10 comprising part of the conveyor apparatus 12 extends along the right-hand side of the final path of movement of the automobile established by such conveyor apparatus and defines the track for the wheels on the right-hand side of cars advancing along the same. The guide rail 10 is so arranged that it is contacted as a guide surface by the inside face of the right-hand wheel tires, and to that end such rail is approximately five inches high and has a smoothly rounded upper corner which will not scratch or mar the entire walls and which minimizes any opportunity for a wheel to climb over the rail. Conveyor apparatus 12 further comprises in this example parallel endless chains 14 and 16, the upper stretches of which extend at or above floor level parallel to guide rail 10. Those chains carry transverse pusher rolls 18 spaced at intervals along their length, one of which lodges behind the right front wheel RF of an automobile in order to advance it along the guide rail 10. A trap door 20 at the entrance end of the conveyor apparatus normally covers the aperture (not shown) through which the chain-drawn pusher rolls emerge upwardly into position to engage the front wheel of an approaching car. The spacing between the two chains 14 and 16, i.e. the length of the rolls extending between such chains, is sufficient to accommodate automobile wheel tires from the largest size down to the smallest size. The application of towing force to the right front wheel of an automobile tends to turn such wheel in the direction toward the guide rail 10 and thereby holds such wheel against the guide rail throughout the conveyor run. The return stretch of the conveyor chains 14 and 16 is not shown but extends beneath the floor level from the exit end (not shown) back to the entrance point at which the trap door 20 is located.

A traversing plate 22 located just ahead of the conveyor apparatus and extending transversely to the length thereof in a horizontal plane substantially at floor level, is mounted on aligned pairs of guide rollers 24 and 26 which engage parallel tracks 28 and 30, respectively. These tracks are mounted on the underside of the plate and extend lengthwise thereof, keeping the plate in a defined path of movement transverse to the length of the conveyor run. The length of the plate in its direction of travel exceeds the width of the widest automobile so that both rear wheel of such automobile must run on the plate in making the approach to the apparatus. The width of the plate 22 lengthwise of the conveyor is sufficient that both rear wheels of the automobile will be on the plate at all times during the turning operation. Specifically, the down-path edge 22a is located adjacent the entrance end of the guide rail 10 so that the right-hand rear wheel of the automobile will reach the guide rail before it runs off the traversing plate, whereas the up-path edge 22b is spaced sufficiently from the edge 22a as to insure that the right-hand rear wheel RR will have rolled onto the traversing plate 22 by the time the left hand rear wheel LR reaches contact with the first deflector rail 32.

The initially contacted deflector rail 32 extends diagonally across the forward left-hand corner of the traversing plate 22 in the latter's normal or retracted position. Retraction of the traversing plate is effected by means of a spring 34 which draws it to the left in this instance, whereby its left edge 22c contacts a fixed stop 36. The right-hand edge 22d of the traversing plate is offset to the right of the line of guide rail 10 so that the right-hand rear wheel of the car will run upon the plate in completing the approach. The ends of the deflector rail 32 are anchored to the floor or other support, the lower edge of the deflector rail being elevated slightly above the top surface of the plate 22 to avoid interference with traversing movements of the latter. A second or final deflector rail 38 is joined to the end of the guide rail 10 and extends diagonally therefrom toward the left, to overlie the traversing plate 22. The deflector rail 38 is relatively short so that its projecting end will not interfere with the left front wheel of a sharply turning automobile making the approach (Figure 1), nor will it interfere with any undercarriage parts of an approaching automobile. Preferably the angle of inclination of the final deflector rail 38 is slightly greater than the angle of the initial deflector rail 32. Both rails preferably extend about five inches above the level of the traversing plate 22 and have right hand upper corners which are rounded smoothly along their length so as to minimize any tendency of the automobile wheels to climb over the rail but rather to slide smoothly along the length thereof and thereby slue the rear of the car to the right as a result of the freedom of movement of the supporting plate 22. If desired, rollers may be provided along the upper edges of the two deflector rails 32 and 38 in order to minimize further any tendency of the automobile wheels to climb over the deflector rails. However, such rollers are usually unnecessary.

Figure 3:
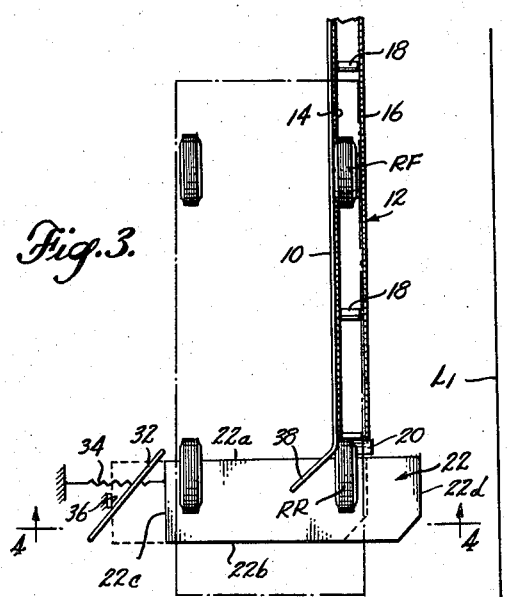
Figure 3 is a similar view in which the guiding apparatus has completed the sluing operation and the automobile is aligned with the new path of travel.
Figure 4:
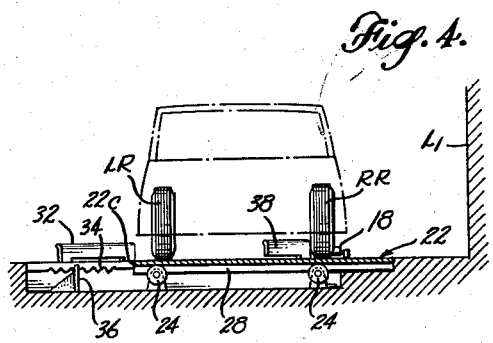
Figure 4 is a sectional end elevation taken on line 4—4 in Figure 3, showing particularly the traversing plate and its relationship to the deflector rails.
Figure 5:
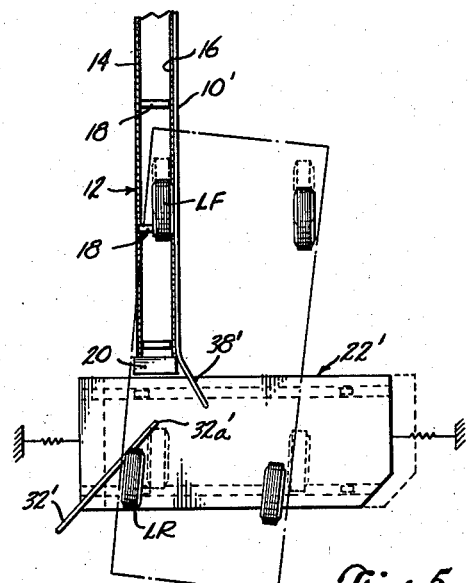
Figure 5 is a plan view of a modification, showing a relatively small automobile of small tire size making the approach.
Figure 6:
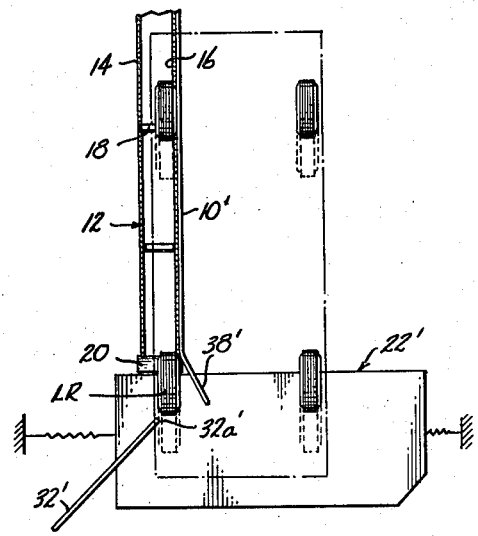
Figure 6 is a plan view in which the automobile has completed the approach and is aligned with the final path of travel.

The arrangement is such that as an automobile approaches the apparatus in a sharp left turn, as in Figure 1 for example, the traversing plate 22 is in its initial or normal position against the stop 36. First, the left front wheel LF rolls over the traversing plate with the vehicle still under its own power. The driver of the automobile steers it to advance the right front wheel RF into sliding contact with the guide rail 10, as shown by the dotted line position in Figure 1, whereupon the next pusher roll 18 emerging through the opening normally covered by the trap door 20 will lodge behind such wheel and draw the automobile forwardly along the conveyor run. The automobile is shown being drawn along the conveyor in Figure 2. As it advances, the rear of the automobile must be swung substantially to the right in order to place the right rear wheel RR in the track of the right front wheel RF, particularly so that it will travel along the same side of the guide rail 10. For reasons previously mentioned, the final deflector rail 38 must be relatively short and, because of its shortness, is inadequate of itself to catch the right rear wheel RR in order to produce the required sluing of the vehicle to the right in conjunction with the traversing plate 22. The right rear wheel would either pass by the inside of the end of the deflector rail 38 or would run over the end thereof, depending upon the length and width of the automobile. Consequently, the deflector rail 32 is provided in this apparatus and performs the function of producing an initial sluing of the automobile to the right, by its contact with the left rear wheel LR as the latter moves onto the traversing plate 22. The amount of displacement of the vehicle to the right during this initial deflecting operation enables the second deflector rail 38 now to catch the right rear wheel RR and to continue the sluing of the vehicle in the same direction on the traversing plate 22 until finally the wheels are aligned with and follow in the track of the front wheels, as shown in Figure 3. The provision of two deflector rails, therefore, is an important feature of this invention, enabling the traversing action of the plate 22 to slue vehicles into proper alignment with the conveyor track regardless of the length and width of the different vehicles and regardless, to a large degree, of moderate or normal differences in the exact path of approach followed by different drivers. The amount of space available in which to execute a turn may sometimes be as small as that defined by the corner represented by the intersecting lines L1 and L2 in Figure 1. Consequently, vehicles approaching the conveyor apparatus are doing so in a very sharp turn made necessary by the need for conserving all of the available length of the lot for occupancy by the conveyor and associated car washing machinery. The turning apparatus itself occupies only a small fraction of that total length and yet accomplishes the guiding of an automobile into complete alignment with the desired path of travel in a very efficient and versatile manner.

Preferably, the guide rail 10 is situated on the right-hand side of the path of travel of the vehicle through the establishment and engages the inside walls of the right wheels so that the vehicle may drive off under its own power from the exit end of the establishment in a directly executed right-hand turn without any interference between the guide rail and the wheels on the outside of the turn. This is usually desirable since the curb lane of traffic in the street adjoining such an establishment is usually directed to the right.

In the modification shown in Figures 5 to 8 inclusive, the sluing movement of the vehicle guiding it in the completion of its turn into the conveyor track is accomplished in two successive steps as in the first and preferred embodiment. In this instance, however, the first and second guide rails 32' and 38', respectively, both contact the left rear wheel LR, and the guide rail 10' is situated on the left side of the path of travel, as is the conveyor apparatus comprising chains 14 and 16 and the series of pusher rolls 18 connected therebetween. The installation is designed for left-turn approaches as before.

Figure 7:
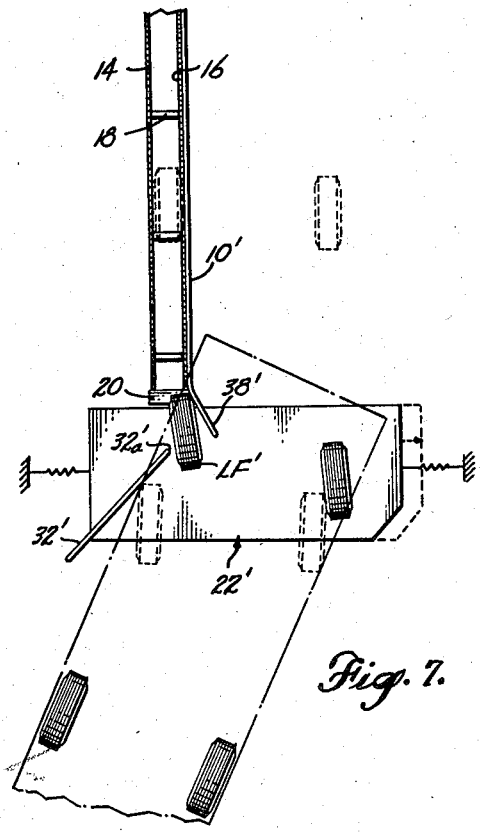
Figure 7 is a plan view of the same modified apparatus showing a large automobile, having relatively wide tires making the approach.
Figure 8:
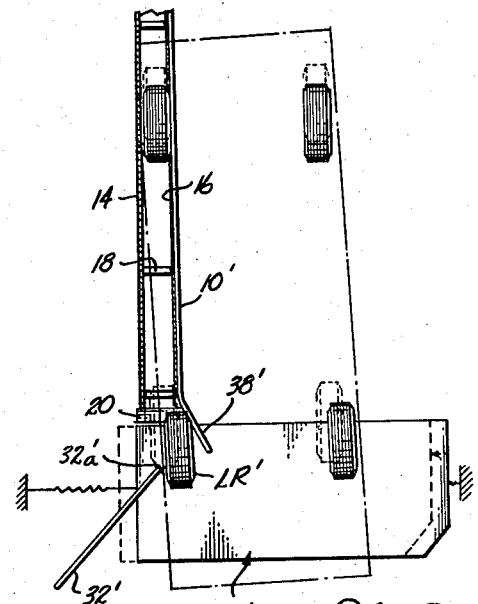
Figure 8 is a similar view in which the automobile is being slued into final alignment with the conveyor means.

In this embodiment, a somewhat wider traversing plate 22' is necessary because of the direct tandem arrangement of the deflector rails 32' and 38', particularly the necessity of spacing along the direction of travel, between the down-path end 32'a of deflector rail 32', and deflector rail 38'. As the left rear wheel LR engages and is slewed to the right by contact with rail 32', such wheel advances toward alignment with the path of travel defined by the guide rail 10'. It is important and desirable that the inside face of the left wheels of the vehicle track closely along the adjacent face of the guide rail 10'. For small vehicles, having the narrowest tires, the rail end 32'a is preferably so located in relation to the guide rail 10' that these wheels will emerge from the rail 32' substantially in alignment with the desired track along rail 10'. However, there is a wide variation in the size of automobile tires. A large vehicle tire may be nearly twice as wide as the smallest size vehicle tires, and for this reason the second deflector rail 38' is provided. The first deflector rail 32', which properly positions a small wheel tire will over-position a large wheel tire, as shown in Figures 7 and 8, wherein the left rear wheel LR' has been moved beyond the desired line of movement by the deflector rail 32'. However, as the car advances further, this wheel now contacts the second deflector rail 38' which is joined to the guide rail 10' and is inclined opposite to the rail 32' so that the vehicle is now slued back toward the left the necessary distance in order to bring the inside face of the wheel or tire into alignment with the inside face of the guide rail 10' as desired. In order to permit this reverse sluing movement of wide-tired vehicles, the longitudinal spacing between the rail end 32'a and the rail 38' is necessary, as indicated above; however, space conservation dictates that the spacing be no greater than necessary.

This modified embodiment is less desirable than the first-mentioned embodiment because of the greater length of the apparatus in the direction of the conveyor, necessitated partly by the spacing between the deflector rails 32' and 38' and the corresponding increase in the width of the traversing plate 22' in the direction of travel. However, this modified apparatus is also versatile in its ability to handle automobiles of various sizes and lengths and of various tire sizes, as is the preferred embodiment.

In both embodiments, it will be recognized that a reversal of the positions of certain parts and of the relative angles of inclination of the deflector rails will enable the guiding apparatus to operate for right-hand approach turns.

These and other variations will be evident to those skilled in the art, as being within the scope of the inventive subject matter.

I claim as my invention:

1. In apparatus for guiding a driven automobile around a sharp turn into alignment with a generally straight final track in a minimum turning distance, means defining a guideway for the wheels on one side of the automobile, said guideway extending along and defining said final track, platform means positioned at ground level immediately ahead of the initial end of said guideway means and having dimensions permitting it to be driven upon by both rear wheels of the automobile simultaneously during completion of the turn, said platform means having a final edge extending substantially transverse to said final track in the vicinity of said guideway means initial end, and an initial edge generally parallel to said final edge and located in advance thereof, said platform means comprising an antifriction conveyor directionally selective to permit relatively antifrictional sluing movement of the rear of the automobile sidewise of itself but only in a direction substantially transverse to said final track, and first and second elongated wheel deflectors horizontally disposed and stationarily mounted overlying said platform means, with the first deflector being offset from the second in a direction toward the automobile approaching the turn, both of said deflectors being inclined to the final track in a horizontal plane and both being high enough above ground level to resist tendency for the rear wheels to roll up and over them, said second deflector extending, with its incline being in the direction toward the approach of the turning automobile, from the initial end of said guideway means and over the platform means only part way from said final edge toward said initial edge thereof by a distance insufficient to be contacted by the rear wheel on said one side with the automobile turning normally, said first deflector extending materially farther than said second deflector toward said initial edge, to be contacted by one rear wheel when the latter has moved onto the platform means, whereby rear wheel deflecting contact occurs first with the first deflector to slue the rear of the automobile sidewise by a sufficient initial increment to produce subsequent deflecting contact with the second deflector by the rear wheel on said one side, and thereby to finally slue the automobile into alignment with said final track.

2. The combination defined in claim 1, wherein the deflectors are inclined in the same direction and the offset of the first from the second approximates the automobile width.

3. The combination defined in claim 1, wherein the deflectors are inclined oppositely and the minimum distance of such offset of the first from the second approximates the wheel width.

4. The combination defined in claim 1, wherein the platform means comprises a plate-like means mounted on antifriction rollers to permit free traversing movement of such plate-like means in the direction transverse to the final track from a predetermined rest position of said plate-like means, and motivating means connected to such plate like means and operable to return the same to such rest position after automobile-actuated displacement thereof out of such rest position.

References Cited in the file of this patent

UNITED STATES PATENTS

| 1,603,321 | Cook | Oct. 19, 1926 |
| 2,010,462 | Nielsen | Aug. 6, 1935 |
| 2,085,329 | Porte | June 29, 1937 |

FOREIGN PATENTS

| 516,983 | Belgium | Jan. 17, 1953 |